Nov. 9, 1943.  J. R. HARRINGTON  2,333,783
RECORDER
Filed April 27, 1940  2 Sheets-Sheet 1

Inventor:
James R Harrington
By Brown, Jackson, Boettcher & Dienner
Attys

Patented Nov. 9, 1943

2,333,783

UNITED STATES PATENT OFFICE 2,333,783

RECORDER

James B. Harrington, Mansfield, Ohio, assignor to The Autocall Company, Shelby, Ohio, a corporation of Ohio Application April 27, 1940, Serial No. 331,681

17 Claims. (Cl. 234—27.5)

The present invention relates generally to recorders, and has particular reference to type wheel recorders adapted to make a printed record on a paper tape or the like. In the preferred embodiment shown, this recorder is arranged to respond to an electrical signalling system over which are transmitted groups of code impulses which designate conditions existing at certain signalling stations or transmitters, and which also designate the particular station or transmitter which is transmitting this condition signal. However, it will be understood that this is merely one illustrative use of the recorder, and that it is capable of use in various other situations.

In electrical signalling systems of the class referred to, each complete signal usually comprises several components or groups of signal impulses. For example, the first component may designate any one of a predetermined set of conditions, such as an alarm condition of "fire," or a supervisory condition of "power off," etc. Following this condition designating component, are the station designating components, which may be either numerals or letters or both, such as "638" or "ADH" or "A 36." The station designating component may consist of one, two, three, or even more digits, depending upon the number of stations transmitting signals to the recorder, and this station designating component may either precede or succeed the condition designating component in the actual transmission of the groups of code impulses.

The conventional form of recorder heretofore used for recording these signals, particularly on moderately large systems, usually comprises four type wheels, one wheel having legends thereon for the condition designating component, and the three other type wheels having numerals or letters thereon for the transmitter designating component. This prior form of recorder operates upon the principle of performing a selecting function with regard to the type wheels, whereby the successive wheels are selected to respond in turn to different groups of code impulses. Also, this prior form of recorder operates upon the principle of using only a single printing platen, which is actuated once for each complete signal recorded, this only occurring after all of the type wheels have been set up to their proper positions. Still further, this prior form of recorder operates upon the principle of making the printed impressions upon a paper tape which is not advanced until after the complete signal has been imprinted thereon, and which is then advanced in a direction at right angles to the axis of the type wheels.

In the new embodiment of recorder which I disclose herein, I reverse these principles of operation by employing only one type wheel instead of a plurality of type wheels; and by employing a plurality of printing platens instead of only one platen. In one embodiment of my improved recorder herein shown, the paper tape is advanced in a direction parallel to the axis of the type wheel, and in another embodiment it is advanced in a direction at right angles to the type wheel. Another distinction resides in the fact that the selecting function is performed with respect to the plurality of printing platens, whereby one platen is employed for recording the condition designating portion of the signal, and another platen or platens are employed for recording the station designating portion of the signal. A further distinction is that a plurality of successive printing operations are performed on the paper tape during the performance of a single signalling cycle, i. e., as each group of signal impulses arrives at the recorder, the printing impression corresponding thereto is immediately made before the next group of impulses arrives.

My new embodiment of recorder is more simple and less expensive to construct than the conventional type of recorder referred to, principally by reason of the use of one type wheel, and also by having the selecting function performed entirely electrically, rather than largely through complicated mechanical selecting mechanism.

Numerous other distinctions, advantages, and objects of the present invention will appear from the following detail description of one preferred embodiment of this new recorder. In the accompanying drawings illustrating such embodiment:

Figures 1, 2:
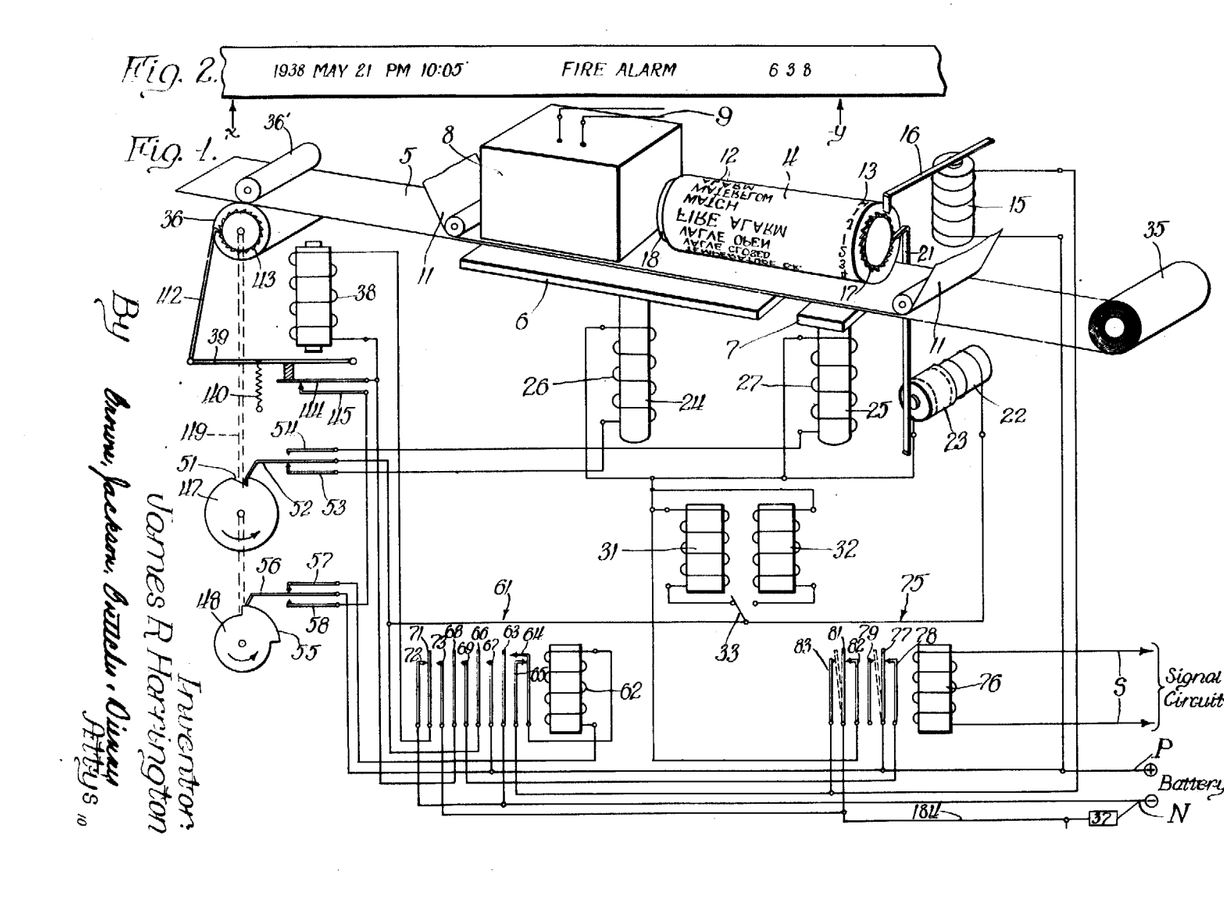
Figure 1 is a diagrammatic view which schematically illustrates in perspective the type wheel, paper tape, printing platens, etc.
Figure 2 is a front view of a portion of the paper tape, showing typical printed impressions thereon.

Referring to Figure 1, the single type wheel or type drum is indicated at 4, the paper tape at 5, and two printing platens at 6 and 7. Any conventional form of time stamp 8 is disposed just beyond the type wheel 4, this time stamp comprising the conventional type wheels for printing the year, month, day, and time of day that each signal is received. It will be noted that the large platen 6 extends under this time stamp to coact with these wheels. A circuit 9 connecting with the time stamp serves either to conduct impulses of current thereto each minute, or to conduct a regulated alternating current thereto serving to drive a synchronous motor in the time stamp. Any conventional form of inking ribbon 11 travels between the upper surface of the paper tape 5 and the lower surfaces of the type wheel 4 and time stamp 8.

The type wheel or drum 4 is made sufficiently long to accommodate two or more annular rows of type characters 12 and 13, which are located at longitudinally spaced points along the length of the type wheel. For the purpose of illustration, the lefthand row of type characters 12 is shown as consisting of legends or other indicia for designating conditions, and the righthand row 13 is shown as consisting of numerals (followed by letters where the wheel has more than 10 printing positions) for designating the location of the station transmitting the signal, it being understood of course that this is merely exemplary and that the type characters may be of any species for conveying any desired knowledge, signal information or the like. The actuation of the large lefthand platen 6 makes a printed impression of the lowermost type legend in the lefthand row 12, and the actuation of the small righthand platen 7 makes a printed impression of the lowermost type character in the righthand row of characters 13. The type wheel 4 is given a step-by-step advancement by successive energizations of an advancing or step-up electromagnet 15. Suitable actuating mechanism 16 comprising an armature and an advancing pawl is arranged to respond to the electromagnet 15 and to impart step-by-step movement to a ratchet wheel 17 which is secured fast to the type wheel 4. The advancing motion imparted to the type wheel through the energization of the electromagnet 15 is in opposition to the action of a torsion spring 18 which normally tends to rotate the type wheel back to a predetermined home or normal position, as determined by a pair of coacting stops. The type wheel is held in each position to which it is advanced by the action of a releasable holding pawl 21 which coacts with the teeth of the ratchet wheel 17. This holding pawl is adapted to be released by the energization of a releasing-electromagnet 22. This electromagnet is of the slow acting type, being slow to operate and slow to release, such operating characteristic being obtained by the use of a copper sleeve 23 as illustrated, or by the use of a dash-pot or other known expedient.

The two printing platens 6 and 7 are adapted to be actuated by solenoid cores 24 and 25 respectively which operate within their individual electromagnets 26 and 27. These solenoid cores are preferably arranged to have a lost motion plunger action so that they drive their respective platens 6 and 7 up into printing position by impact action, for a very rapid printing operation.

The inking ribbon 11 is adapted to be advanced in one direction by the successive energizations of the electromagnet 31, and is adapted to be advanced in the other direction by successive energizations of a companion electromagnet 32. A ribbon travel reverse switch 33 is arranged to alternately connect either one or the other of these two electromagnets in circuit, this switch being thrown in one direction when the ribbon unwinding from one reel nears depletion, and being thrown in the other direction when the ribbon unwinding from the other reel nears depletion. Each electromagnet 31, 32 operates appropriate advancing pawl mechanism for driving the reel which is then functioning as the take-up reel for winding in the ribbon, which mechanism may be of any preferred construction.

The paper tape 5 is drawn from a supply roll 35 and is fed in successive steps beneath the type wheel 4 and time stamp 8 by the action of a paper feed roller 36. Coacting with the feed roller 36 is a spring pressed roller 36' which holds the paper tape 5 pressed against the feed roller. This feed roller is adapted to be advanced by any appropriate motor, which might be a revolving armature or rotor type of motor, although I preferably employ a reciprocating armature type of motor, as shown. This latter type of motor preferably comprises an electromagnet 38 to which responds an armature 39 which is normally returned to its retracted position by a spring 40, and which carries an advancing pawl 42 adapted to engage with the teeth of a ratchet wheel 43 operatively connected with the paper feed roller 36, for advancing the latter with a step-by-step motion. The operating relation is such that the attracted movement of the armature 39 in response to the energization of the electromagnet 38 merely results in the pawl 42 moving up to engage the next tooth of the ratchet wheel 43, the actual advancing motion not being imparted to the paper feed roller 36 until after the electromagnet 38 is deenergized, whereupon the spring 40 restores the armature 39 to normal position and thereby effects the actual advancing motion of the feed roller. The ratchet wheel 43 may be connected directly with the feed roller or may have a geared-up connection therewith to produce a greater angular movement of the feed roller. Also responding to the motion of the armature 39 is a pair of vibratory or homing contacts 44 and 45, these contacts being closed when the armature is in its retracted position and being open when the armature is in its energized position. As will hereinafter appear, these vibratory contacts function at the conclusion of the printing operation to cause a relatively rapid operation of the feed roller 36 for the purpose of quickly projecting into visible position that portion of the tape on which the printed record has just been made.

Rotating concurrently with the paper feed roller 36 are two control cams 47 and 48. The driving connection from the feed roller to the cams, diagrammatically indicated at 49, may be either a direct drive or a geared drive, the only requirement being that each cam 47, 48 make one comptete revolution, or complete one cycle of operation, for each complete movement of the paper tape from the point $x$ to the point $y$ (Figure 2), this distance representing a complete record on the tape corresponding to one complete cycle of the recorder. The cam 47 is adapted to perform a selecting function with regard to the two platens 6 and 7, this cam having a notch 51 therein which coacts with the middle contact spring 52 of a group of three contact springs 52, 53, 54. Figure 1 shows the recorder in its normal condition, at which time the middle contact spring 52 rests in the notch 51, this placing said middle contact in engagement with the bottom contact 53 so that a circuit is normally completed through these contacts to one end of the electromagnet 26 associated with platen 6. The other end of this electromagnet receives an energizing impulse in a manner to be later described. Thereafter, upon the first advancement of the paper feed roll 36 the resulting movement of the cam 47 deflects the contact spring 52 upwardly to ride on the high surface of the cam, thereby opening the circuit between contacts 52 and 53 and closing a circuit between contacts 52 and 54, the latter circuit extending to one end of the electromagnet 27 associated with the other platen 7.

The other cam 48 has a cam rise or dwell 55, upon the front end of which a contact spring 56 bears in the normal or restored condition of the recorder. As long as this middle contact spring 56 is riding on the cam dwell 55, it is maintaining a circuit connection through upper contact 57 with one end of the electromagnet 62 of control relay 61; but as soon as this contact spring drops off the trailing end of the cam rise the aforesaid circuit connection through contact 57 is broken and a new circuit connection is established from intermediate contact 56 to lower contact 58 and then to the vibratory or homing contacts 44, 45 associated with the paper feed electromagnet 38.

The control or cycling relay 61 comprises the aforementioned electromagnet 62 and any suitable armature apparatus responsive thereto and arranged to actuate the plurality of contacts 63, 64, 65, etc. In the normal condition of the relay 61, the electromagnet 62 is deenergized, the contact 63 stands separated from the contact 64, and said latter contact 64 stands engaged with the contact 65, but upon energization of the relay, the contact 63 moves over and engages the contact 64, and thereafter separates contact 64 from contact 65. Similarly, contact 66 is normally separated from contact 67 but moves into engagement with said latter contact upon energization of the relay; and the same is also true of the similar pair of contacts 68 and 69. Contact 71 normally engages outer contact 72, but, upon energization of the relay, it separates from contact 72 and engages contact 73.

Signaling relay 75 comprises an electromagnet 76 and any suitable armature apparatus responsive thereto and adapted to actuate the two movable contact springs 77 and 81. Under normal conditions, the electromagnet 76 remains continuously energized, i. e., it is continuously energized between recording cycles, and hence under these normal conditions the contact spring 77 is held to the right against contact spring 78, and, likewise, contact spring 81 is held to the right against contact spring 82. Upon deenergization of the electromagnet 76, occurring in the recording cycle, the contact spring 77 drops back to the left against contact spring 79, as indicated in dotted lines (this being a dead or open circuit position for contact 77), and, similarly, the movable contact spring 81 drops back against the contact spring 83.

The control relay 61 and the signaling relay 75 may be a part of the recorder structure, or they may be disposed at any desired point or points removed from the recorder.

This improved recorder, at least in its broader aspects, is capable of responding to practically any form or relation of coded impulses transmitted in any type of electrical signaling system, such as fire alarm systems, supervisory control systems, automatic telephone systems, etc. Furthermore, my improved recorder may be employed in systems using spring driven transmitters, or it may be employed in systems using electrically driven transmitters. Moreover, it may be employed in systems where the signal impulses themselves supply the operating energy for the recorder, or it may be employed in systems where a local battery or other source of current serves to supply the operating energy for the recorder, this local source of energy being under the control of the signal impulses.

Certain operating advantages are obtained when the recorder is employed in a signaling system of the general class disclosed in my prior Patent No. 2,164,324, issued July 4, 1939. Systems of similar nature are also disclosed in my prior Patent No. 1,950,108 and in my prior Patent No. 2,202,853, issued June 4, 1940. For the sake of a complete, illustrative disclosure, I shall describe my improved recorder as employed in a signaling system of the type shown in the above-mentioned Patent No. 2,164,324, it being understood, however, that by such description of the recorder in this type of signalling system I am not necessarily limiting the recorder to use with that type of system. The signal circuit denoted S in the drawings of the present application is intended to correspond with the signal circuit S disclosed in said prior patent, it being noted that this signal circuit is connected with the electromagnet 76 of the signalling relay 75. The operating energy for the recorder is supplied from a local battery, which corresponds to the positive battery bus P and negative battery bus N of the prior patent. The positive battery bus P is connected with one terminal of the step-up or advancing electromagnet 15, and also has branched connection with the contact 77 of signalling relay 75, with the contact 67 of control relay 61, and with the middle contact spring 56 which is responsive to cam 48. The negative battery bus N is connected with the two contacts 63 and 72 of the control relay 61. During the operation of the signal system, current impulses of constant frequency are fed to the recorder and to other parts of the system from one side of the battery through the medium of a pulsing device or oscillator which is diagrammatically indicated at 37. This oscillator is described in detail in my prior patent above identified, and is preferably connected with the negative side of the battery for impressing negative current impulses of constant frequency on conductor 184 during the operation of the signal system. These negative current impulses are conveyed through conductor 184 to contact 81 of the signaling relay 75 and to contact 73 of the control relay 61. During the operation of the recorder, the energization and deenergization of electromagnet 76 of relay 75 occur during an open circuit condition of said oscillator 37.

Referring now to the operation of the apparatus, in the normal condition of the signaling system and recorder, the type wheel 4 stands in the normal position to which it has been restored upon the completion of the last recording cycle; the cams 47 and 48 stand in the positions illustrated; the control relay 61 is in a deenergized condition so that all of its movable contacts 63, 66, 68, and 71 stand in the positions illustrated; and the signaling relay 75 is in an energized condition so that its movable contacts 77 and 81 are held in their attracted positions, as illustrated in full lines. The type wheel may have a blank space or may have any desired printing indicia, such as "Test 0," normally disposed in the printing position.

When any one of the transmitters of the system starts to operate, the signalling rotor of that transmitter arrives at a signalling position which de-energizes the signal circuit S and the signalling relay 75. This allows contact 77 to separate from contact 78 and to engage contact 79, and allows contact 81 to separate from contact 82 and to engage contact 83, as indicated by the dotted line positions of both movable contacts 77 and 81. Concurrently with the starting of the signalling transmitter, the oscillator 37 also starts, and thereafter transmits negative current impulses to the recorder throughout the entire recording cycle. When contact 81 engaged contact 83, it immediately transferred these negative current impulses to contact 65 of control relay 61, one of such impulses being conducted from contact 65 through contact 64 to one terminal of the relay winding. Positive battery polarity is normally impressed on the other terminal of this relay winding from positive battery bus P through contacts 56 and 57 so long as the contact 56 rides on the raised cam dwell 55. Hence, the winding 62 of relay 61 is energized by this negative impulse received from the oscillator, and in such energization the contact 63 is brought against contact 64, and contact 64 is moved out of engagement with contact 65, whereby the relay 61 locks itself up until the completion of the recording cycle. This will be evident from the fact that when contact 63 engages contact 64 a continuous supply of negative polarity is fed from negative battery bus to the relay winding 62, independently of the impulses from the oscillator 37, and the winding 62 remains energized until the contact 56 drops off the cam dwell 55 and breaks positive supply through contact 57, at the end of the recording cycle. The energization of relay 61 also moved contact 66 into engagement with contact 67, moved contact 68 into engagement with contact 69, and moved contact 71 out of engagement with contact 72 and into engagement with contact 73. The engagement of contact 66 with contact 67 serves to conduct positive polarity to the terminals of three different electromagnets, to wit: positive polarity is conducted from contact 66 through ribbon reverse switch 33 to one or the other of the ribbon advancing electromagnets 31 or 32; positive polarity is also conducted to one terminal on the type wheel releasing electromagnet 22; and positive polarity is also conducted through contacts 52 and 53 to one terminal of the printing electromagnet 26. However, neither of these electromagnets is energized at this instant because the open circuit condition between contacts 81 and 82 of signalling relay 75 prevents the negative impulses, transmitted from oscillator 37, from being conducted to the other terminals of these electromagnets. The engagement of contact 68 with contact 69, upon the locking up of control relay 61, does not at this instant convey positive battery polarity to the lower terminal of the paper feed electromagnet 38 because contacts 68 and 69 are connected in series with contacts 77 and 78 of signalling relay 75, and, at this time, these signalling relay contacts 77 and 78 are open.

The movement of contact 81 out of engagement with contact 82 and into engagement with contact 83, upon the initial de-energization of signalling relay 75, established a circuit from negative oscillator 37 up to one terminal of the type wheel step-up electromagnet 15. The other terminal of this electromagnet has permanent connection with positive battery bus P. Hence, this electromagnet is energized successively by each negative oscillator impulse, for imparting step-by-step advancing motion to the type wheel 4 as long as the signalling relay 75 remains de-energized. Thus, the type wheel will be advanced one step or any desired number of steps for this first or initial component of the signal, depending upon the coded arrangement on the signalling rotor of the transmitter now operating. Assuming that this first component of the signal is the condition designating component, and that the condition to be signalled is "Fire alarm," then the type wheel 4 is advanced just far enough to bring that particular legend of the row of legends 12 into the lowermost position on the wheel, corresponding to the printing position. The advancing motion of the type wheel is stopped at this point by the re-energization of the signalling relay 75 over signal circuit S, the resulting movement of the relay contacts 77 and 81 back to their full line positions interrupting the transmission of negative oscillator impulses from conductor 184 through contacts 81 and 83 to the electromagnet 15. The attracted movement of contact 81 back into engagement with contact 82 results in the next negative oscillator impulse being transmitted to the ribbon advance electromagnet 31 or 32 (depending upon the position in which the switch 33 is then standing); to the printing electromagnet 26, and to the type wheel release electromagnet 22. Upon receiving this negative oscillator impulse, these three electromagnets are all simultaneously energized, because relays 31 or 32 and 22 have previously been receiving positive polarity through control relay contacts 66 and 67, and printing electromagnet 26 has previously been receiving positive polarity through contacts 66 and 67 and through contacts 52 and 53. The energization of the electromagnet 31 or 32 imparts advancing motion to the inking ribbon 11 through any suitable construction of ribbon drive mechanism. The energization of the electromagnet 26 results in a printing actuation of the relatively long platen 6 which, in a single stroke, prints the chronological data set up by the time stamp 8 and also prints the condition designating component of the signal, represented by the legend "Fire alarm." The type release electromagnet 22 is energized simultaneously with the printing electromagnet 26, but, owing to the delayed action established in the electromagnet 22 by the copper sleeve 23, the holding pawl 21 is not released until after the printing platen 6 has had opportunity to make its printing impression.

At the same time that signalling relay contact 81 engaged contact 82 and transmitted a negative oscillator impulse up to the three aforementioned electromagnets, the other contact 77 of this same relay engaged contact 78 and transmitted positive battery potential through contacts 68 and 69 up to the lower terminal of the paper feed electromagnet 38. The other terminal of this electromagnet 38 has connection through control relay contacts 71 and 73 with the negative oscillator bus 184, and hence this same negative oscillator impulse which energized the electromagnets 22, 26, and 31 or 32 also energizes the paper feed electromagnet 38. However, as previously remarked, it is not the energization of the electromagnet 38 that imparts advancing motion to the feed roll 36, but rather it is the de-energization of said electromagnet that operates through the downstroke of the advancing pawl 42 to advance the feed roll, and hence the printing electromagnet 26 has opportunity to de-energize (concurrently with the de-energization of the electromagnet 38) and the printing platen 6 has opportunity to drop down out of engagement with the paper tape 5 before the feeding roll 36 has motion imparted thereto for advancing the paper tape. This initial advancing motion of the tape, resulting from the single downstroke of the pawl 42, only moves the tape a short distance, represented, for example, by the distance between type characters in the transmitter designating portion of the signal "6 3 8." This initial motion of the paper feeding roll 36 rotates both cams 47 and 48 through a one-step advancement. The movement of the cam 47 results in the contact 52 being cammed upwardly out of the notch 51 for causing said contact to separate from contact 53 and to engage with contact 54. This performs the aforementioned selecting function of transferring the supply of positive battery potential from the first printing electromagnet 26 to the second printing electromagnet 27. This initial advancement of the other cam 48 results in no change at its associated contacts 56, 57, and 58. Upon the cessation of this single negative oscillator impulse, we find that the chronological portion and the condition designating portion of the signal have been printed upon the paper tape, the type wheel 4 has been restored to its normal position, the paper tape 5 has been advanced a predetermined distance, and the relation of the contacts 52, 53, and 54 has been reversed so that positive battery potential has been disconnected from printing electromagnet 26 and has been transferred to printing electromagnet 27, whereby said latter electromagnet has been placed in readiness to perform the next step of the printing operation.

Immediately after the performance of the above-described operations, the signal circuit S is again deenergized so that the relay contacts 77 and 81 drop back to their dotted-line positions. Thereupon, the succeeding negative impulses from the oscillator 37 are again transmitted through contacts 81 and 83 up to the type wheel advancing electromagnet 16. In this stage of the recording cycle, the type wheel 4 is advanced a sufficient distance to bring the first of the desired numerical digits into printing position. Assuming that the transmitter designating portion of the signal is "6 3 8," as shown in Figure 2, then the type wheel is stepped forward a distance to bring the numeral "6" into printing position. When the type wheel has been stepped to this point, the signal circuit S is again re-energized for moving the relay contacts 77 and 81 back into their full-line positions. This results in a second energization of the selected ribbon advancing electromagnet 31 or 32, the type wheel release electromagnet 22, the second printing electromagnet 27, and the tape feeding electromagnet 38. The second printing electromagnet 27 is energized at this time in contradistinction to the first printing electromagnet 26, by virtue of the above-described switching operation which has occurred at the contacts 52, 53, and 54 in consequence of the motion of the cam 47. This second energization of the electromagnets 22, 27, and 38 results in the performance of a printing operation by the small platen 7, the subsequent release of the holding pawl 21 and the feeding of the paper tape through the distance between integers of the numeral portion of the signal. Assuming that the transmitter is sending the signal which appears in Figure 2, the above-described printing operation has resulted in the impression of the numeral "6" on the tape. This printing operation or printing step is the same as that previously described except that the small platen 7 is actuated instead of the large platen 6.

The subsequent operations of then printing the numeral "3" and finally the numeral "8" are merely repetitions of the printing steps or operations described above. The performance of each printing step advances the cam 48 one more step until the end of the cam rise 55 passes beyond the contact spring 56 and allows the contact to move out of engagement with contact 57 and into engagement with contact 58. This occurs immediately upon the cessation of the last one-step feeding operation of the paper tape 5 after the last numeral "8" has been printed on the tape. At this time, the signal circuit S has been re-energized and the signal relay contacts 77 and 81 are back in their full-line positions. The separation of contact 56 from contact 57 disconnects positive battery potential from the electromagnet 62 of control relay 61, thereby interrupting the lock-up energization of this relay and causing it to restore to its normal de-energized condition. The engagement of contact 56 with lower contact 58 transfers this positive battery potential to the vibrating or homing contacts 44, 45 associated with the paper feed electromagnet 38. The de-energization of control relay 61 has restored relay contact 71 into engagement with contact 72 so that the upper terminal of electromagnet 38 is thereupon connected to negative battery bus N which supplies continuous polarity to the electromagnet 38. Hence, the electromagnet 38 is now receiving current from the positive and negative battery busses P and N subject only to the relatively rapid interruption established at the homing contacts 44 and 45. Accordingly, the paper feed roll 36 is given a relatively rapid step-by-step motion through a relatively long range of travel so as to project into a visible position all of that portion of the paper tape upon which the last record has just been printed. This relatively rapid, continuous operation of the feeding roll 36 ceases when the leading edge of the cam rise 55 moves back to normal position under the contact 56. The separation of contact 56 from contact 58 interrupts the supply of positive polarity to the homing contacts 44, 45 so that further operation of the electromagnet 38 ceases; and the engagement of contact 56 with contact 57 transfers this positive potential back to one terminal of the winding 62 of relay 61 so that this relay is in readiness to be energized as soon as signalling relay 75 transfers a negative oscillator impulse to relay contact 65. At the same time that the cam 48 resumes its normal position, the other cam 47 also resumes its normal position, with the contact 52 engaging in the notch 51 and completing a circuit through contact 53 to the first printing electromagnet 26, whereby this electromagnet will be first energized in the next recording cycle. The recorder is thus back in its normal condition.

Figure 3:
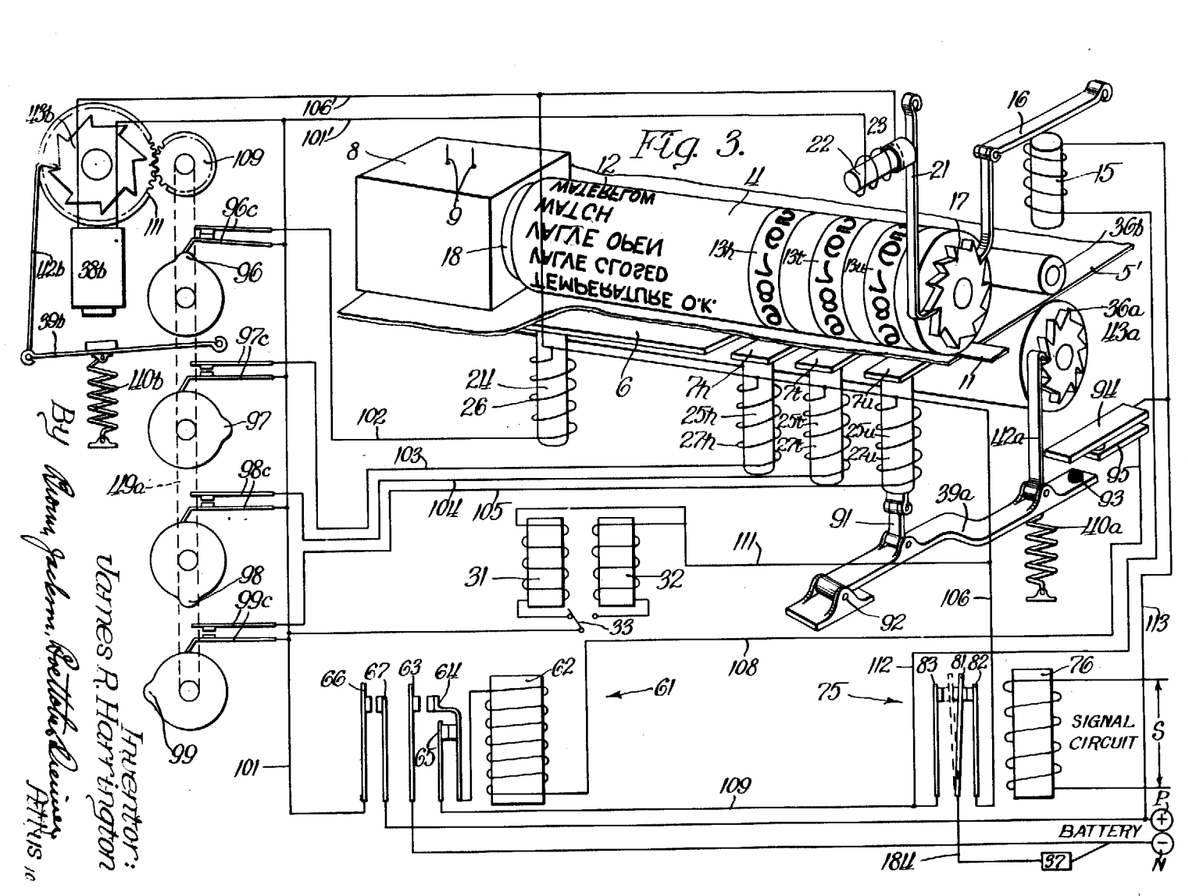
Figure 3 is a diagrammatic view, similar to Figure 1, showing a modified embodiment of my improved recorder.

The modified construction of recorder illustrated in Figure 3 differs from the construction just described principally in that the printing impressions are made on a relatively wide paper tape 5' which is advanced in a direction substantially at right angles to the axis of the type wheel or drum 4; also, in that the numeral type characters are grouped in three circular rows, corresponding to hundreds, tens, and units, each of which circular rows of numerals has a separate printing platen. The paper tape 5' is fed from any suitable supply roll, such as a roll 35, and is of sufficient width to span the length of the single type drum 4 and also the time stamp 8. The inking ribbon 11 travels between the upper surface of the paper tape 5' and the lower surfaces of the type drum 4 and time stamp 8, this inking ribbon preferably travelling in a direction parallel to the axis of the type drum, although this is not essential. One end of the type drum is provided with the annular row of type legends or other indicia 12 for designating conditions, substantially as described of the embodiment illustrated in Figure 1. The other end portion of the type drum has a plurality of annular rows of type characters for designating the location of the station transmitting the signal. If the numerals designating the stations extend into the hundreds range, three such rows of type numerals are provided, the row 13h designating the hundreds numerals, the row 13t designating the tens numerals, and the row 13u designating the units numerals. This type drum 4 is given step-by-step advancement by the successive energization of the advancing or step-up electromagnet 15 acting through the armature and pawl mechanism 16 to impart movement to the ratchet wheel 17 secured to the type drum, in the same manner as described in the preceding embodiment. Such advancing motion imparted to the type drum is in opposition to the action of a torsion spring 18 which normally tends to rotate the type drum back to a predetermined home or normal position, as determined by a stop on the type drum engaging a stationary stop. Also, as described of the preceding embodiment, the type drum is held in each advanced position by a releasable holding pawl 21 which responds to a releasing electromagnet 22, the latter having a copper sleeve 23 or other suitable arrangement made so as to be slow to operate and slow to release.

The long printing platen 6 is arranged to coact with the circular row of condition designating legends 12, and with the time stamp 8, in the same manner previously described. As previously remarked, each ring of numeral characters 13h, 13t, and 13u is provided with an individual printing platen 7h, 7t, and 7u, respectively. These platens are actuated by solenoid cores 25h, 25t and 25u which respond to the energization of electromagnets 27h, 27t, and 27u, respectively.

The feed of the paper tape 5', which is in a direction at right angles to the type 4 as previously remarked, is effected by any suitable feeding mechanism, preferably in the form of a feed roller 36a which is held in contact with the paper tape by the spring-pressed roller 36b. The feed roller 36a is adapted to impart feeding motion to the paper tape 5' following the final printing operation performed by the last actuated printing platen. The printing platen last to be actuated will ordinarily be either the condition designating platen 6 or the unit numeral platen 7u. In the illustrated embodiment, I have assumed that the latter platen 7u is the last platen in the series to be operated, and, accordingly, I have shown the mechanism which actuates the feed roller 36a as being responsive to the core 27u of that platen. This core has connection through a link 91 with an operating arm or lever 39a having one end mounted on a stationary pivot 92. The other end of said lever carries an advancing pawl 42a which is adapted to impart step-by-step advancing movement to a ratchet wheel 43a operatively connected with the paper feed roller 36a. A spring 40a normally tends to hold the lever in its lower retracted position. The outer portion of the lever 39a carries an insulating button 93 which is adapted to strike a spring contact 94 when the lever reaches the upper limit of its movement. The button striking this spring contact 94 moves this contact spring upwardly away from a lower coacting contact spring 95, thereby opening a control circuit between these two contact springs at the instant that the lever 39a reaches the upper limit of its motion, this circuit opening function interrupting the locked-up relation of relay 61, as will be later described. Attention is directed to the fact that no advancing motion is imparted to the feed roller 36a during the upstroke of the lever 39a which follows from the energization of electromagnet 27u, but that the feeding motion is imparted to said roller 36a only after the conclusion of the printing operation effected by platen 7u, it being the downward motion of pawl 42a impelled by spring 40a which imparts advancing motion to the feed roller. Normally, the contact springs 94 and 95 are in engagement, being only separated momentarily when the lever 39a reaches the upper limit of its motion. In lieu of a mechanical instrumentality such as the lever 39a, I may employ electrical means responsive to the platen 7u for advancing the paper tape 5' and for momentarily separating the contacts 94—95.

The selective energization of the platen actuating electromagnets 26, 27h, 27t, and 27u is responsive to automatically operating sequence or selecting switch means which may be embodied in various forms of switch apparatus. In the diagrammatic illustration shown, I employ four concentrically arranged cam lobes 96, 97, 98, and 99, each controlling cooperating contacts 96c, 97c, 98c, and 99c, respectively. One contact of each of the aforesaid pairs of contacts is tapped off a common conductor 101 leading from contact 66 of relay 61. The other contacts of each of these pairs are connected through conductors 102, 103, 104, and 105, with their respective electromagnets 26, 27h, 27t, and 27u. The opposite terminals of all four electromagnets have tapped connection with a common conductor 106 extending from contact 82 of signaling relay 75. Referring again to the cams 96—99, these are all rotated simultaneously through a common shaft indicated at 49a. The four cam lobes are angularly separated a distance of 90° so that each one-quarter revolution of the shaft 49a will result in a selecting function for placing the next electromagnet in circuit to be energized. The shaft 49a is arranged to have these quarter revolution advancing steps imparted thereto through a small pinion 109 which is mounted on the shaft and is driven from a relatively large spur gear 111 meshing therewith. The gear wheel 111 is given a step-by-step advancing motion through a ratchet wheel 43b which is actuated by an advancing pawl 42b carried by the armature 39b and responding to the electromagnet 38b. The upstroke of the armature 39b merely moves the pawl 42b up to the next tooth of the ratchet wheel 43b, the wheel not being advanced until the electromagnet 38b is deenergized, whereupon the spring 40b restores the armature and imparts the advancing motion to the ratchet wheel. As previously remarked, the relation of the gears 109, 111, and the number of teeth on the wheel 43b is such that each deenergization of electromagnet 38b results in the cam assembly being advanced one-fourth of a revolution for bringing the next succeeding cam into circuit closing position with respect to its contacts. The conductor 101 extending from contact 66 of control relay 61 has connection through conductor 101' with one terminal of type release electromagnet 22 and one terminal of the cam stepping electromagnet 38b. The conductor 106 which extends from contact 82 of signaling relay 75 has connection through conductor 106' with the other terminal of said type release electromagnet 22 and said cam stepping electromagnet 38b.

The remainder of the wiring substantially corresponds with the previously described embodiment. The control or cycling relay 61 and the signaling relay 75 may be electrically connected in the system substantially as disclosed in the preceding embodiment, or these relay structures may be simplified and connected in the recorder system as illustrated in Figure 3. The signal circuit S is connected with the electromagnet 76 of signaling relay 75, and contact 81 of said relay is connected through conductor 184 with the oscillator 37, substantially as described of the preceding embodiment. The signaling relay 75 is normally energized, and in such energized condition the contact 81 occupies the full line position in engagement with contact 82 which establishes a circuit such that negative impulses from this oscillator can be effective through conductors 106 and 106' upon the platen actuating electromagnets and upon type release electromagnet 22 and cam advancing electromagnet 38b. Upon the deenergization of the signaling relay 75, the movable contact 81 drops back into the dotted line position in engagement with contact 83, thereby establishing a circuit through which negative impulses from the oscillator are made effective on the type wheel step-up electromagnet 15. Positive battery terminal P is permanently connected with the other terminal of the type wheel step-up magnet 15, and is also connected with contact 67 of control relay 61. Negative battery terminal N is connected with contact 63 of control relay 61. Contact 64 of said latter relay is connected with one end of the winding 62 of said relay, the other end of said winding being connected through wire 108 with contact spring 95. The cooperating contact 65 of relay 61 is connected through wire 109 with back contact 83 of the signaling relay 75. The ribbon actuating electromagnets 31 and 32 which drive the inking ribbon 11 alternately in opposite directions are connected through ribbon travel reverse switch 33 and conductor 101 to contact 66 of relay 61, and are connected at their other ends through conductor 111 and conductor 106 to front contact 82 of relay 75.

Referring now to the operation of this form of recorder, the type wheel 4 may have a blank space or may have any desired printing indicia, such as "Test 0 0 0" normally disposed in the printing position. When any one of the transmitters of the system starts to operate, the resulting deenergization of the signaling relay 75 allows contact 81 to separate from contact 82 and to engage contact 83. The oscillator 37, which is set into operation with the starting of the transmitter about to transmit a signal, sends negative impulses through contact 81 to contact 83 of relay 75. The first of these impulses is effective through conductor 109 and relay contacts 65 and 64 to energize the electromagnet 62 of relay 61, the electromagnet 62 having positive polarity impressed thereon at this time through release contacts 94 and 95. The resulting energization of electromagnet 62 brings contact 63 into engagement with contact 64 and locks up the relay 61, as described of the preceding embodiment. The energization of relay 61 also completed a circuit through contacts 66 and 67 for conducting positive battery polarity to the cam actuated selector contacts 96c–98c, this positive polarity being also conducted through wire 101' to one terminal of type release electromagnet 22 and to one terminal of cam stepping electromagnet 38b. The impulses transmitted from oscillator 37 are also transmitted from relay contact 83 up through conductor 112 to the type step-up electromagnet 15, the other terminal of this electromagnet having permanent connection with positive battery polarity through conductor 113. The resulting energization of electromagnet 15 one or more times, corresponding to the code designation of the signal box then operating, sets up the type wheel 4 to a corresponding position. As described of the preceding embodiment, the first signal impulse or impulses may be employed to set up the corresponding condition designation 12, or, alternately, it may be employed to set up one of the station designating numerals 13h—13u. It will be assumed that the condition designation 12 is first set up for the printing impression. When the type wheel 4 is in this desired position, the reenergization of signaling relay 75 moves contact 81 into engagement with contact 82 so that the next succeeding impulse from the oscillator 37 is directed up through conductor 106 to the upper ends of the platen actuating electromagnets 26, 27h—27u, and also through conductor 106' to the other terminals of type release electromagnet 22 and cam stepping electromagnet 38b. The illustrated positions of the cams 96—99 represent their normal positions, and it will therefore be seen that at this time positive polarity is being conducted through contact springs 96c to the lower end of platen actuating electromagnet 26. Hence, this electromagnet is energized immediately upon receiving such negative current impulse from oscillator 37, with the result that the long platen 6 is impelled upwardly to make the printing impression of the lowermost condition designating legend 12, and also of the time stamp 8. Because of the slow action of the type release electromagnet 22, the printing impression is made before the holding pawl 21 is retracted for allowing the type wheel to be restored to normal position. The energization of cam stepping electromagnet 38b on this same oscillator impulse merely moved armature 39b upwardly for effecting engagement with the next tooth of the ratchet wheel 43b, the ratchet wheel and cams not being advanced until the cessation of said current impulse. Upon the cessation of this impulse, the cams are advanced to move cam lobe 96 out from under its contacts 96c, opening the circuit at these contacts, and to move the cam lobe 97 into operative position beneath its respective contacts 97c, thereby closing the circuit at these latter contacts. Such places conductor 101 in communication with conductor 103 leading to the lower end of the platen actuating electromagnet 27h.

This same general operation is now repeated for setting up the type wheel 4 to the appropriate hundreds position of the hundreds row of numerals 13h, then to the appropriate tens designation of the tens row of numerals 13t, and finally to the appropriate units designation of the units row of numerals 13u, the successive printing platens 7h, 7t and 7u being successively actuated following the setting up of the type wheel into these hundreds, tens, and units positions. The successive advancement of the cams 96—99 selectively placed the platen actuating electromagnets 27h—27u in circuit with conductor 101, in the same manner described above in connection with cam 96 and contacts 96c. The energization of the units printing electromagnet 27u brings about the final printing operation for that signaling cycle. As previously described, the upward movement of the core 25u in this electromagnet moves the paper feed advancing pawl 42a upwardly to engage the next succeeding tooth of the ratchet wheel 43a on paper feed roll 36a. This same current impulse also energized electromagnets 22 and 38b. The upward motion of the lever 39a caused a separation of release contacts 94 and 95 for breaking the lock-up circuit 108 of control relay 61, but the breaking of this lock-up circuit did not occur until after electromagnets 22 and 38b had been energized, and therefore the holding pawl 21 and armature 39b perform their intended functions notwithstanding the separation of relay contacts 66 and 67. The downward movement of lever 39a upon the cessation of said last impulse from oscillator 37 causes the paper feed roll 36a to be rotated for advancing the paper tape 5' through the appropriate distance for bringing the next succeeding printing area into position beneath the type wheel 4. The cessation of that impulse also operated the cams 96—99 to restore cam lobe 96 to its normal position under the contact springs 96c, as illustrated. The recorder is now back in the normal condition that it was in at the start of the recording cycle.

Certain operating advantages are obtained when the embodiment of recorder illustrated in Figure 3 is employed in a signaling system of the type shown in my aforementioned Patent No. 2,164,324, as herein described. Nevertheless it will be understood that by thus describing this embodiment of my recorder as used in such type of signaling system, I am not necessarily limiting the recorder to use with that type of system. With regard to the form of record produced, I preferably make inked impressions on a paper tape as shown, but either embodiment of the invention might be modified to make impressions on carboned paper, wax coated paper, or other miscellaneous treated tapes, charts, etc. With regard to the cycling of either embodiment of the recorder, this is not dependent upon a definite predetermined number of digits or impressions, totalling, for instance, one condition designating digit or impression and three numeral digits, but could consist of any number of digits or impressions not greater than the number of steps of cam 48 of Figure 1, or of cams 96—99 of Figure 3. For example, if, after the printing of the condition designating component of the signal (such as "Fire alarm"), only a single numerical digit should be set up and printed, signalling relay 75 would remain energized and cams 41—48 (Figure 1) or cams 96—99 (Figure 3) would continue to advance at a speed determined by the oscillator 37 until, in the case of Figure 1, contact 56 would separate from contact 57 and engage contact 58, whereupon the recorder would complete its own sequence. Cam 48 is not limited in the number of steps it would necessarily have to take before completing its cycle, as it could be arranged to accommodate any practical length of signal. In the case of Figure 3, the units platen 7u will always be operated as a final printing operation, irrespective of whether the type wheel has been actuated for setting up any particular units numeral, and the cessation of the current impulse which effects this printing operation also results in the cam stepping electromagnet 38b restoring the cams 96—99 to normal position.

While I have illustrated and described what I regard to be the preferred embodiments of my invention, nevertheless it will be understood that such are merely exemplary and that numerous modifications and rearrangements may be made therein without departing from the essence of the invention.

I claim:

1. In a recorder adapted to record condition designating signals and station designating signals transmitted over a signal circuit from a plurality of signal stations, the combination of a type drum, a first group of type characters on said drum adjacent one end thereof for designating the condition existing at the signalling station, a second group of numerical type characters on said drum adjacent to the other end thereof for numerically designating the signalling station, first and second printing platens cooperating with said first and second groups of type characters respectively, first and second electromagnets for actuating said first and second printing platens respectively, feeding means for feeding a paper tape in a direction approximately parallel to the axis of said type drum, selecting means responsive to said feeding means for selectively controlling the energization of said first and second electromagnets, advancing means for advancing said type drum comprising an advancing electromagnet, and relay means responsive to the signals transmitted over said signal circuit and controlling the energization of said electromagnets, whereby in a first position of said tape said first group of type characters impresses the condition designating portion of the signal on said tape, and whereby in second, third and fourth positions of said tape said second group of numerical type characters impresses the hundreds, tens and units designation of the signalling station on said tape.

2. In a recorder adapted to record condition designating signals and station designating signals transmitted over signal circuit connections leading from a plurality of signal stations, the combination of a type drum, a first group of type characters on said drum for designating the condition existing at the signalling station, a second group of numerical type characters on said drum for numerically designating the station transmitting the signal, first and second printing platens cooperating with said first and second groups of type characters respectively, first and second electromagnets for actuating said first and second printing platens respectively, feeding means for feeding a paper tape in a direction approximately parallel to the axis of said type drum, selecting means responsive to said feeding means for selectively controlling the energization of said first and second electromagnets, advancing means for advancing said type drum comprising an advancing electromagnet, and cycling means cooperating with said selecting means and with said electromagnets whereby in one position of said tape said first group of type characters impresses the condition designating portion of the signal on said tape, and whereby in a plurality of other positions of said tape said second group of numerical type characters impresses the units and tens or the units, tens and hundreds designation of the signaling station on said tape.

3. In a recorder adapted to record condition designating signals and station designating signals transmitted over a signal circuit from a plurality of signal stations, the combination of a type drum, a first group of type characters on said drum for designating the condition existing at the station transmitting the signal, a second group of numerical type characters on said drum for numerically designating the station transmitting the signal, first and second printing platens cooperating with said first and second groups of type characters respectively, first and second printing electromagnets for actuating said first and second printing platens respectively, feeding means for feeding a paper tape in a direction approximately parallel to the axis of said type drum, selecting means responsive to said feeding means for selectively controlling the energization of said first and second printing electromagnets, advancing means for advancing said type drum comprising an advancing electromagnet, releasable holding means for holding said type drum in its different advanced positions comprising a releasing electromagnet, a signal relay responsive to said signal circuit and serving to direct signal impulses to said advancing electromagnet, and a control relay responsive to said signal relay and serving to control said releasing electromagnet and coacting with said selecting means to control the selective energization of said first and second printing electromagnets, whereby in a first position of said tape said first group of type characters impresses the condition designating portion of the signal on said tape, and whereby in second, third and fourth positions of said tape said second group of numerical type characters impresses the hundreds, tens and units designation of the signalling station on said tape.

4. In a recorder adapted to record condition designating signals and station designating signals transmitted over signal circuit connections from a plurality of signal stations, the combination of a type drum having a first group of type characters on said drum for designating the condition existing at the signalling station, a second group of numerical type characters on said drum for numerically designating the signalling station, first and second printing platens cooperating with said first and second groups of type characters respectively, first and second printing electromagnets for actuating said first and second printing platens respectively, feeding means for feeding a paper tape relatively to said type drum, selecting means responsive to said feeding means for selectively controlling the energization of said first and second printing electromagnets, advancing means for advancing said type drum comprising an advancing electromagnet, and means responsive to the signals transmitted over said signal circuit and controlling the energization of said electromagnets, whereby in one position of said tape said first group of type characters impresses the condition designating portion of the signal on said tape, and whereby in a plurality of separate positions of said tape said second group of numerical type characters impresses the numerical designation of the signalling station on the tape.

5. In a recorder adapted to record condition designating signals and station designating signals transmitted over signal circuit connections from a plurality of signal stations, the combination of a type drum, a first group of type characters on said drum for designating the condition existing at the signalling station, a second group of numerical type characters on said drum for numerically designating the signalling station, first and second printing platens cooperating with said first and second groups of type characters respectively, first and second printing electromagnets for actuating said first and second printing platens respectively, feeding means comprising a stepping electromagnet and pawl and ratchet mechanism actuated thereby for feeding a paper tape in a direction approximately parallel to the axis of said type drum, selector switch means actuated by said pawl and ratchet mechanism for selectively controlling the energization of said first and second printing electromagnets, advancing means for advancing said type drum comprising an advancing electromagnet, releasable holding means for holding said type drum in its different advanced positions comprising a releasing electromagnet, and relay means responsive to the signals transmitted over said signal circuit connections and controlling the energization of said electromagnets, whereby in one position of said tape said first group of type characters impresses the condition designating portion of the signal on said tape and whereby in one or more other positions of said tape separate from said first named position said second group of numerical type characters impresses the numerical designation of the signalling station on said tape.

6. In a recorder adapted to record condition designating signals and station designating signals transmitted over a signal circuit from a plurality of signal stations, the combination of a type drum, a first group of type characters on said drum for designating the condition existing at the signalling station, a second group of type characters on said drum for designating the station transmitting the signal, first and second printing platens cooperating with said first and second groups of type characters respectively, first and second printing electromagnets for actuating said first and second printing platens respectively, feeding means comprising a stepping electromagnet and pawl and ratchet mechanism actuated thereby for feeding a paper tape in a direction approximately parallel to the axis of said type drum, and selector switch means actuated by said pawl and ratchet mechanism for selectively controlling the energization of said first and second printing electromagnets.

7. In a recorder adapted to record different groups of signals transmitted over a signal circuit from a signal station, the combination of a type drum, a first group of type characters on said drum for recording one group of signals, a second group of type characters on said drum for recording another group of signal characters, first and second printing platens cooperating with first and second groups of type characters respectively, first and second printing electromagnets for actuating said first and second printing platens respectively, feeding means comprising a stepping electromagnet and pawl and ratchet mechanism actuated thereby for feeding a paper tape relatively to said type drum, and selector switch means actuated by said pawl and ratchet mechanism for selectively controlling the energization of said first and second printing electromagnets.

8. In a recorder adapted to record condition designating signals and station designating signals transmitted over a signal circuit from a plurality of signal stations, the combination of a rotatable type drum, means for feeding a paper tape to printing position relatively to said type drum, a first group of type characters on said drum adapted to make printing impressions on said tape in designating the condition existing at the station transmitting the signal, a second group of type characters on said drum adapted to make printing impressions on said tape in designating the station transmitting the signal, advancing means for advancing said type drum comprising an advancing electromagnet, releasable holding means for holding said type drum in its different advanced positions and comprising a releasing electromagnet, first and second printing platens cooperating with said first and second groups of type characters respectively, first and second printing electromagnets for actuating said first and second printing platens respectively, a rotary selector switch comprising a stepping electromagnet, pawl and ratchet mechanism actuated thereby, rotary cam means having unidirectional stepping motion imparted thereto by said pawl and ratchet mechanism, selector contacts responsive to said rotary cam means for selectively causing one of said printing electromagnets to be energized at one point in the printing cycle and the other of said printing electromagnets to be energized at another point in the printing cycle, and relay means responsive to the signalling station for controlling the energization of said other electromagnets.

9. In a recorder adapted to record condition designating signals and station designating signals transmitted over a signal circuit from a plurality of signal stations, the combination of a rotatable type drum, means for feeding a paper tape relatively to said type drum, one group of type characters located on one part of said drum and adapted to make printing impressions on said tape in designating the condition existing at the station transmitting the signal, another group of type characters located on another portion of said drum and adapted to make printing impressions on said tape in designating the particular station transmitting the signal, advancing means for advancing said type drum comprising an advancing electromagnet, releasable holding means for holding said type drum in its different advanced positions and comprising a releasing electromagnet, a plurality of printing platens cooperating with said plurality of groups of type characters, a plurality of printing electromagnets for individually actuating said plurality of printing platens, selector switch means comprising a stepping electromagnet, pawl and ratchet mechanism actuated thereby, rotary cam means having unidirectional stepping motion imparted thereto by said pawl and ratchet mechanism, and selector contacts responsive to said rotary cam means for selectively causing said printing electromagnets to be energized at different times in the printing cycle.

10. In a recorder adapted to record condition designating signals and station designating signals transmitted over a signal circuit from a plurality of signal stations, the combination of a rotatable type drum, means for feeding a record receiving medium relatively to said type drum, one group of type characters on one part of said drum adapted to make printing impressions on said record receiving medium in designating the condition existing at the station then transmitting a signal, another group of type characters on another portion of said type drum adapted to make printing impressions on said record receiving medium in designating the particular station which is then transmitting the signal, a plurality of printing platens adapted to coact with said different groups of type characters in making the printing impressions, a plurality of printing electromagnets for individually actuating said plurality of printing platens, and selector switch means comprising a stepping electromagnet, pawl and ratchet mechanism actuated thereby, rotary cam means having unidirectional stepping motion imparted thereto by said pawl and ratchet mechanism, and selector contact means responsive to said rotary cam means for selectively causing the energization of said printing electromagnets to occur at different times in the printing cycle.

11. In a recorder adapted to record condition designating signals and station designating signals transmitted over a signal circuit from a plurality of signal stations, the combination of a rotatable type drum, means for feeding a paper tape relatively to said type drum, one group of type characters on said drum adapted to make printing impressions on said tape in designating the condition existing at the station then transmitting the signal, a second group of type characters on said drum adapted to make printing impressions on said tape in designating the particular station transmitting the signal, a plurality of printing platens cooperating with said different groups of type characters, a plurality of printing electromagnets for selectively actuating said plurality of printing platens, a rotary selector switch for selectively energizing said different printing electromagnets at different times in the printing cycle, and means responsive to the signals transmitted over said signal circuit for controlling said rotary selector switch.

12. In a recorder adapted to record condition designating signals and station designating signals transmitted over a signal circuit from a plurality of signal stations, the combination of a rotatable type drum, means for feeding a paper tape relatively to said type drum, one group of type characters on said drum adapted to make printing impressions on said tape in designating the condition existing at the station then transmitting the signal, a second group of type characters on said drum adapted to make printing impressions on said tape in designating the particular station transmitting the signal, a plurality of printing platens cooperating with said different groups of type characters, a plurality of printing electromagnets for selectively actuating said plurality of printing platens, a rotary selector switch for selectively energizing said different printing electromagnets at different times in the printing cycle, means responsive to the deenergization of one of said printing electromagnets for actuating said tape feeding means, and means responsive to signals transmitted over said signal circuit for controlling the operation of said rotary selector switch.

13. In a recorder adapted to make a printed record of signals transmitted from a signalling station, the combination of a single type drum operative to print the entire signal transmitted from said signalling station, said drum comprising a plurality of longitudinally spaced circular rows of type characters, a plurality of printing platens arranged whereby one of said platens is individual to each row of type characters, feeding means for feeding a record receiving medium between said type drum and said printing platens, said feeding means feeding said medium in a direction approximately parallel to the axis of said type drum, means for rotating said type drum to bring a desired character of one of said rows of type characters into printing position, means for then actuating the printing platen corresponding to that row to make a first printed impression, means for then restoring said type drum to a normal position, means for actuating said feeding means for causing a feeding motion of the record receiving medium following said first printed impression, means for again rotating said type drum to bring a desired character of another of said rows of type characters into printing position, means for then actuating the printing platen corresponding to said latter row of type characters to make another printed impression, means for again restoring said type drum to normal position, means for again actuating said feeding means to again feed said record receiving medium, and selecting means actuated substantially concurrently with said feeding means for selectively controlling the actuation of said printing platens.

14. In a recorder adapted to make a printed record of signals transmitted from a signalling station, the combination of a single type drum operative to print all of the elements of a signal transmitted from said signalling station, said drum comprising a plurality of longitudinally spaced circular rows of type characters, a plurality of printing platens arranged whereby one of said platens is individual to each row of type characters, said type drum and printing platens adapted to coact to make printed impressions on a record receiving tape disposed between said drum and platens, means for rotating said type drum to bring a desired character of one of said rows of type characters into printing position, means for actuating the printing platen corresponding to that row of type characters to make a first printed impression, means for then restoring said type drum to a normal position, means for again rotating said type drum to bring a desired character of another of said rows of type characters into printing position, means for actuating the printing platen corresponding to said latter row to make another printed impression, means for again restoring said type drum to normal position, and means responsive to the actuation of one of said printing platens for feeding the record receiving medium relatively to said type drum and printing platen.

15. In a recorder adapted to make a printed record of signals transmitted from a signalling station, the combination of a single type drum operative to print the entire signal transmitted from said signalling station, said drum comprising a plurality of longitudinally spaced circular rows of type characters, a plurality of printing platens arranged whereby one of said platens is individual to each row of type characters, feeding means for feeding a record receiving medium between said type drum and said platens, means for rotating said type drum to bring a desired character of one of said rows of type characters into printing position, means for actuating the printing platen corresponding to that row of type characters to make a first printed impression, means for then restoring said type drum to a normal position, means for again rotating said type drum to bring a desired character of another of said rows of type characters into printing position, means for actuating the printing platen corresponding to said latter row to make another printed impression, and means for again restoring said type drum to normal position.

16. In a recorder adapted to make a printed record of signals transmitted from a plurality of signalling stations, the combination of a single type drum operative to print the entire signal transmitted from said signalling stations, said drum comprising a first circular row of type characters for designating the condition existing at the station then signalling, and a second circular row of numerical type characters for designating the station transmitting the signal, a first printing platen cooperating with said first row of type characters, a second printing platen cooperating with said second row of type characters, feeding means for feeding a paper tape between said type drum and printing platens in a direction substantially parallel to the axis of said type drum, and mechanism responsive to said feeding means for causing said first row of type characters to print the condition designating portion of the signal on the paper tape and for causing said second row of type characters to print laterally spaced numerical digits on said paper tape for designating the station transmitting the signal, said latter mechanism causing said tape to be advanced parallel to the axis of the type wheel between successive printing operations, whereby said single row of numerical type characters is operative to print hundreds, tens and units digits on the tape in a complete recording cycle.

17. In a recorder, the combination of a rotatable type drum, a first group of type characters extending around one portion of said drum, a second group of type characters extending around another portion of said drum, feeding means for feeding a record receiving medium relatively to said type drum, means for making a printing impression between selected type characters on said drum and said record receiving medium, means for advancing said drum from a predetermined normal position to a selected position for placing a selected one of the type characters of said first group in printing position, means for restoring said type drum back to said normal position after printing said selected type character, and means for again advancing said drum from said predetermined normal position to a selected position for placing a selected one of the type characters of said second group in printing position.

JAMES R. HARRINGTON.